United States Patent [19]
Rand et al.

[11] 3,813,980
[45] June 4, 1974

[54] TRIMMING APPARATUS

[75] Inventors: Douglas R. Rand; Richard D. Tinney, both of Molalla; Charles R. Woods, Oregon City, all of Oreg.; Edward M. Smith, Woodland, Maine

[73] Assignee: Publishers Paper Co., Oregon City, Oreg.

[22] Filed: Sept. 28, 1972

[21] Appl. No.: 292,851

[52] U.S. Cl.................... 83/467, 83/471.3, 83/251, 83/375, 83/391
[51] Int. Cl.......................... B27b 5/20, B27b 27/04
[58] Field of Search .......... 83/468, 467, 471.2, 391, 83/375, 522, 251, 247

[56] References Cited
UNITED STATES PATENTS

| | | | |
|---|---|---|---|
| 2,339,756 | 1/1944 | Aneiros................................ | 83/467 |
| 3,343,644 | 9/1967 | Kljuchnikov et al.................. | 83/467 |
| 3,391,717 | 7/1968 | Melin................................... | 83/468 |
| 3,600,992 | 8/1971 | Dryon.................................. | 83/251 |
| 3,718,061 | 2/1973 | Wilkin................................. | 83/468 |

*Primary Examiner*—Donald R. Schran
*Attorney, Agent, or Firm*—Kolisch, Hartwell & Dickinson

[57] ABSTRACT

Lumber trimming apparatus including an elongated conveyor for carrying a bundle of lumber along a path with the bundle extending lengthwise of the path. A trimmer saw is movable across the path to trim ends of the bundle. An infeed conveyor section upstream in the path from the saw positions and holds the bundle for trimming of its lead end. An outfeed conveyor section downstream from the saw includes an elongated carriage extending longitudinally of the path and mounted for reciprocal movement along the path. Mounted on the carriage are support rollers which are driven under power to move a bundle rapidly along the path. The rollers are stopped when the bundle is approximately positioned for trimming of its trailing end. A ram connected to the carriage is operable to shift the carriage and a bundle thereon slowly and precisely to accurately position the trailing end of the bundle for trimming. An indicator carriage movable on a track parallel to the path includes an arm which is engaged by the leading end of the bundle and is carried thereby, with a tape measure indicating the distance from the leading end of the bundle to the saw. The arm is swingable out of the path of the bundle to allow the bundle to continue along the path after trimming.

12 Claims, 8 Drawing Figures

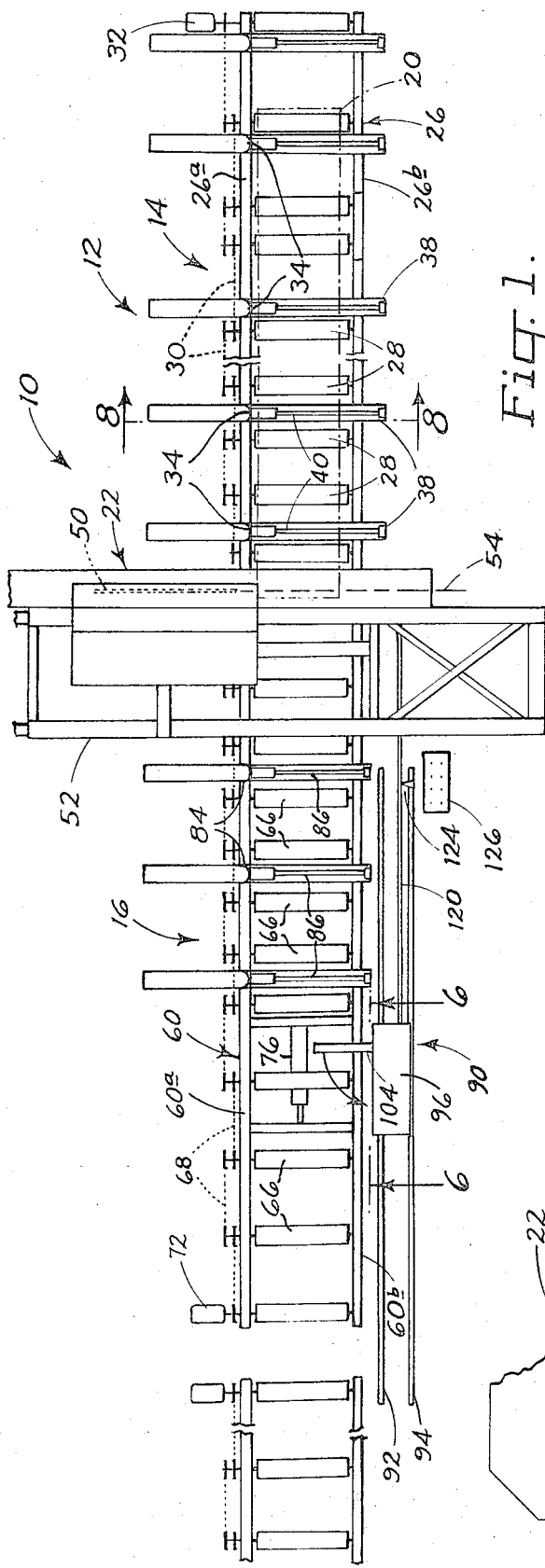
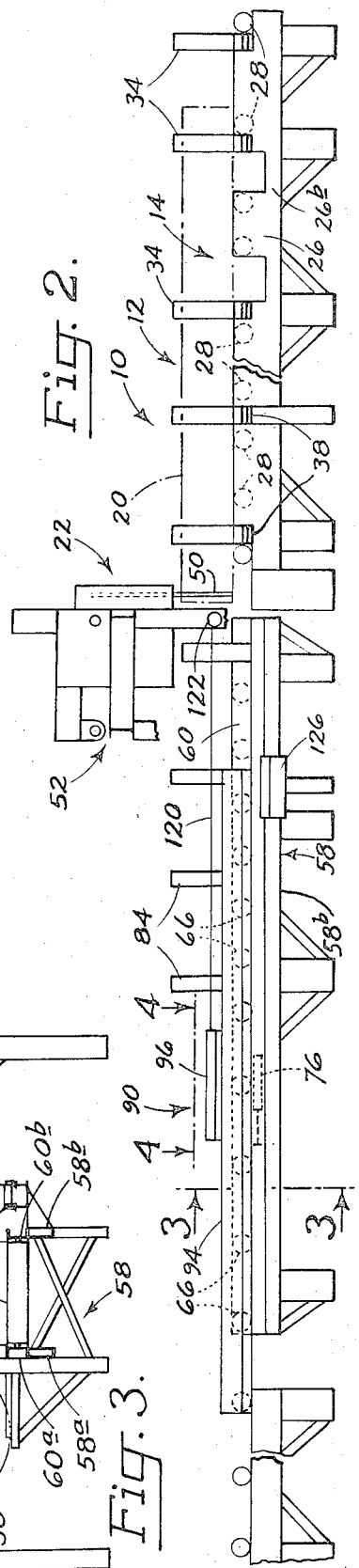
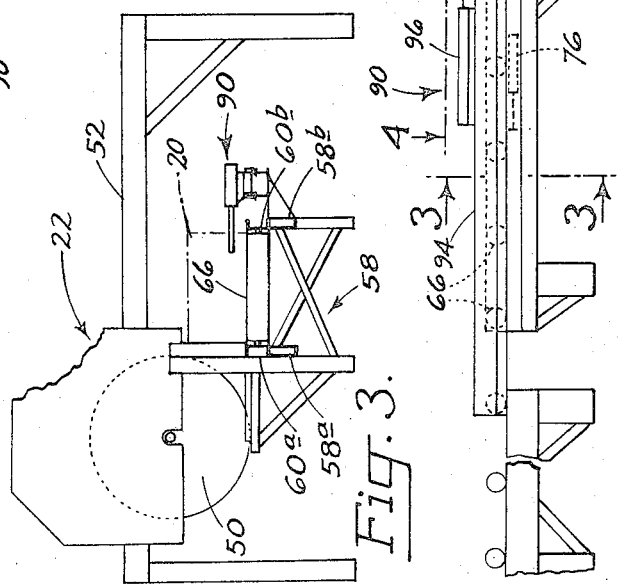

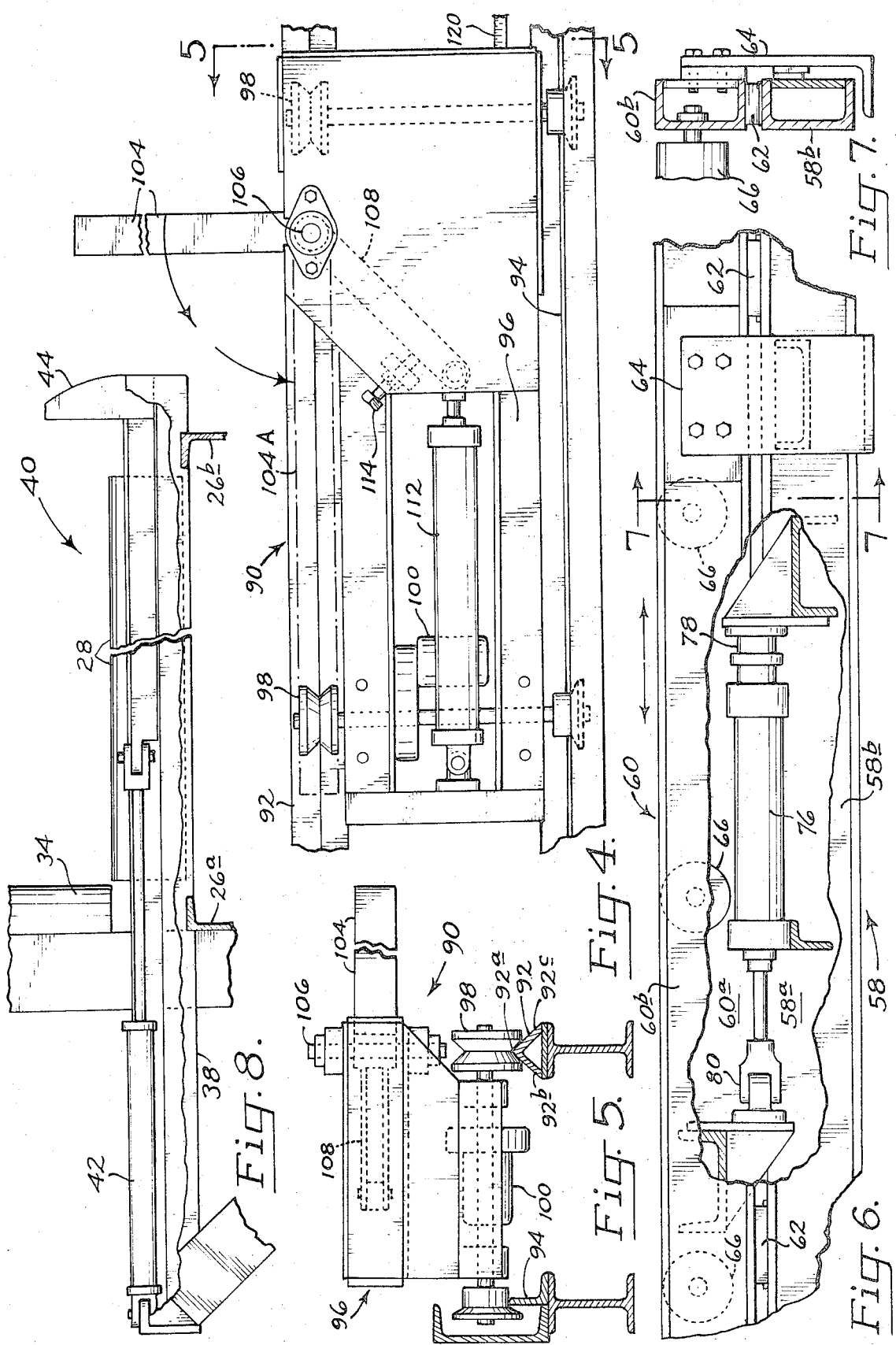

TRIMMING APPARATUS

BACKGROUND AND SUMMARY OF THE INVENTION

This invention relates to apparatus for trimming material, such as lumber, to desired lengths.

In lumber mill operations, boards generally are produced initially in random lengths and then are trimmed to desired lengths. In the past boards have been trimmed on a board-by-board basis to standard foot, or in some cases, foot and inch measurements. With the advent of prefabrication, it has become necessary also to provide for the rapid trimming of boards to the nearest fractions of inches.

A general object of the invention is to provide novel apparatus for trimming articles, such as boards, quickly and precisely to selected lengths.

Another object is to provide novel apparatus which is operable to handle bundles of strapped-together lumber to trim the entire bundle to selected lengths.

Yet another object is to provide such novel apparatus which is operable to trim each individual board, or bundle of boards, passed through the apparatus to different, yet precisely determined, lengths.

More specifically, an object is to provide novel apparatus including a trimming saw which may be moved along a cutting path, and a conveyor which is operable to move an article to be trimmed, such as a board, or bundle of boards, rapidly along a path substantially normal to the cutting path of the saw, approximately to position the end to be trimmed. The apparatus further includes secondary moving means which is operable more slowly and more precisely to position the article with relation to the cutting path. With such apparatus, the article to be trimmed may be quickly moved into approximate cutting position and then more slowly and precisely positioned.

A still further object is to provide in such apparatus novel measuring means including a carriage movable along a path substantially normal to the cutting path for the trimmer saw, and having an engaging member projecting outwardly therefrom to engage an end of a board, or bundle of boards, and means for measuring the distance between the engaging member and the cutting path for the saw. The engaging member is mounted for movement out of the path of the board, or bundle of boards, whereby after the same has been trimmed to length it may be moved away from the trimmer saw in the direction of its end which had been engaged by the engaging member.

DRAWINGS

These and other objects and advantages will become more fully apparent as the following description is read in conjunction with the drawings, wherein:

FIG. 1 is a top plan view of apparatus according to the invention;

FIG. 2 is a side elevation view of the apparatus illustrated in FIG. 1;

FIG. 3 is an end elevation view taken generally along the line 3—3 in FIG. 2.

FIG. 4 is an enlarged top plan view of measuring means in the apparatus taken generally along the line 4—4 in FIG. 2;

FIG. 5 is a view taken generally along the line 5—5 in FIG. 4;

FIG. 6 is an enlarged view taken generally along the line 6—6 in FIG. 1;

FIG. 7 is a view taken generally along the line 7—7 in FIG. 6; and

FIG. 8 is an enlarged view taken generally along the line 8—8 in FIG. 1.

DETAILED DESCRIPTION OF THE INVENTION

Referring now to the drawings, and first specifically to FIGS. 1 and 2, at 10 is indicated generally apparatus according to the invention. In general terms, the apparatus includes an elongated conveyor 12 having infeed and outfeed conveyor sections 14, 16, respectively. The conveyor sections are adapted to support a strapped-together elongated bundle of lumber, as illustrated generally in dot-dashed outline at 20, and convey the same along a generally horizontal path lengthwise of the bundle to the left in the figures. A trimmer saw, indicated generally at 22, is mounted for movement transversely of the path along which a bundle may be conveyed to cut boards extending across the path of the saw.

Describing infeed conveyor section 14 in detail, it includes an elongated, horizontal, stationary frame 26 having elongated, parallel, laterally spaced side members 26a, 26b. A plurality of elongated rollers 28 extend between and are journaled adjacent their opposite sets of ends on side members 26a, 26b. All of the rollers are disposed in the frame with their upper surfaces occupying a common horizontal plane. A series of drive chains 30, illustrated schematically in FIG. 1, operatively connect rollers 28 to a hydraulic motor 32 in such a manner that operation of the motor rotates the rollers, whereby their upper surfaces move toward saw 22.

Secured to and extending upwardly from side member 26a are a plurality of vertical, parallel, laterally spaced aligning members 34. The upright faces of members 34 are disposed in a common vertical plane which extends normal to the cutting path of saw 22.

A plurality of elongated upwardly facing channels 38 extend transversely of side members 26a, 28b between roller 28. Each of channels 38 houses a clamping mechanism indicated generally at 40. Referring to FIG. 8 where a clamping mechanism 40 is illustrated in greater detail, the mechanism includes an elongated, extensible-contractible ram 42 secured within channel 38. An upwardly projecting clamp finger 44 extending above the level of the tops of rollers 28 is connected to the rod end of the ram. Extension and contraction of ram 42 moves the clamp finger away from or toward aligning members 34.

Rollers 28 are adapted to support a bundle of strapped-together boards, such as that indicated generally at 20, and on operation of motor 32 convey the bundle of lumber along a path to the left in FIGS. 1 and 2. The bundle of lumber may be aligned and held on the infeed conveyor section by operation of clamping mechanisms 40. Explaining further, with bundle 20 resting on rollers 28, retraction of rams 42 of the clamping mechanisms draws clamping fingers 44 against the side of the bundle adjacent side member 26b to force the opposite side of the bundle against aligning members 34. When the bundle is brought into firm contact with aligning members 34, it is properly aligned and held on the conveyor for trimming.

Saw 22, also referred to as trimming means, includes an upright circular saw blade 50 which is rotated under power about a horizontal axis extending parallel to the path for a bundle of lumber. The saw is mounted on an elevated frame 52 which is disposed above and extends over conveyor 12. The saw is shiftable under power along frame 52, whereby blade 50 moves along a cutting, or trimming, path, indicated generally by dot-dash line 54, which extends transversely of the conveyor path. The saw thus is able to make a cut in a bundle of lumber normal to the path of the bundle, where the bundle extends across the cutting path.

Disposed on the downstream side of saw 22, (to the left in FIGS. 1 and 2) is an elongated, horizontal, stationary frame 58 having laterally spaced, parallel side members 58a, 58b. An elongated, horizontal carriage 60, having parallel, laterally spaced side members 60a, 60b, rests slidably atop frame 58 with side members 60a, 60b overlying side members 58a, 58b, respectively (see FIG. 3). Nylon bushings 62 are interposed between the side members of the carriage and frame (see FIGS. 6 and 7) to facilitate sliding of the carriage over the frame.

A plurality of guides, similar to that illustrated at 64 in FIGS. 6 and 7, are secured to and project downwardly from carriage 60 on opposite sides of frame 58. These guides confine carriage 60 to straight line reciprocal movement in reverse directions paralleling the path for a bundle of lumber along the conveyor.

A plurality of elongated rollers 66 extend transversely of and have their opposite sets of ends journaled on side members 60a, 60b of the carriage. The rollers are journaled for rotation about horizontal axes extending transversely of the carriage. The upper surfaces of rollers 66 occupy a substantially common horizontal plane with the upper surfaces of rollers 28.

A series of drive chains 68, illustrated schematically in FIG. 1, operatively connect rollers 66 to an interruptible hydraulic motor 72 in such a manner that operation of the motor rotates the rollers, whereby an article placed thereon is conveyed relatively rapidly to the left in FIGS. 1 and 2. Interruption of the operation of motor 72 stops movement of an article along the rollers.

Referring now specifically to FIG. 6, an elongated extensible-contractible fluid-operated ram 76, also referred to herein as carriage drive means, is connected at its cylinder end at 78 to frame 58 and is connected at its rod end at 80 to carriage 60. Extension of ram 76 shifts carriage 60 away from saw 22 in a direction normal to cutting path 54, and retraction of the ram shifts the carriage and rollers mounted thereon toward the cutting path. The ram is operable to move the carriage in either of reverse directions paralleling the conveyor path at a slower speed than the speed at which rollers 66 convey a bundle of lumber therealong.

A plurality of aligning members 84, similar to previously described aligning members 34, and clamping mechanisms 86, similar to clamping mechanisms previously described at 40, are mounted on carriage 60 for reciprocal shifting therewith. Aligning members 84 and clamping mechanism 86 are operable in the same manner as, and serve the same function as previously described in relation to aligning members 34 and clamping mechanism 40; i.e., to align (square up) a bundle of lumber of the conveyor and to hold the same in position on the conveyor.

At 90, in FIGS. 1 and 2, is indicated generally means for measuring the distance from an end of a bundle of lumber on conveyor section 16 to cutting line 54. The measuring means includes a pair of elongated, parallel, laterally spaced, horizontal tracks, or rails, 92, 94 extending parallel to and spaced laterally outwardly from side member 60b. As seen in FIG. 5, track 92 is an angle member positioned to provide an elongated ridge 92a extending longitudinally along its upper surface and sloping side margins 92b, 92c which diverge on progressing downwardly from the ridge.

A wheel-supported indicator carriage, or dolly, 96 rides on tracks 92, 94. As seen in FIGS. 4 and 5, a pair of wheels 98 at one side of the dolly have configurations which substantially conform to the ridge and side margins of track 92 and thus act to maintain a preselected positioning for the dolly as it moves along the tracks.

A motor 100 on dolly 96 is operatively connected to one set of wheels thereon through a friction drive connection and is operable constantly and yieldably to urge the dolly toward the right in FIGS. 1 and 2 along the tracks. The motor and its driving connection with the wheels are such that their driving power, urging the dolly to the right in FIGS. 1 and 2, can be overcome by the force of a bundle of lumber moved to left, as will be described below.

An elongated engaging arm 104 is pivotally connected adjacent one of its ends to the dolly at 106 for swinging movement relative to the dolly about an upright axis. The arm is swingable between an operative position (illustrated in solid outline, extending normally outwardly from the dolly into the path of a bundle of lumber carried along the conveyor), and an inoperative position (illustrated in dot-dash line at 104A extending alongside the dolly and out of the path of a bundle of lumber). The arm thus is swingable in a generally downstream direction in the apparatus as it moves from operative to unoperative positions.

An elongated operating arm 108 is secured adjacent one of its ends to engaging arm 104 and is connected adjacent its other end to the rod end of an extensible-contractible ram 112. The cylinder end of ram 112 is secured on dolly 96. Extension of the ram swings the engaging arm to its inoperative position, as illustrated at 104A, and retraction of the cylinder swings the arm to its operative position, as shown in solid outline. An adjustable stop 114, positioned to engage operating arm 108 on retraction of the ram, operates to properly position arm 104 when in its operative position.

An elongated steel tape measure 120 is connected at one of its ends to dolly 96, and adjacent its other end is wound on a spring-loaded take-up reel 122 on frame 52 (see FIGS. 1, 2 and 4). A pointer 124 (FIG. 1) is secured to track 94 adjacent tape measure 120. The tape measure is marked in such a manner that an operator standing adjacent pointer 124 at a control console 126 can read directly from the tape the distance from operating arm 104 to cutting path 54.

Describing now the operation of the apparatus, initially the rams of clamping mechanisms 40 and 86 on the conveyor are extended, saw 22 is in the position illustrated, with blade 50 disposed laterally of the conveyor path, and dolly 96 of the measuring means is positioned substantially closer to the cutting path than is illustrated in FIGS. 1 and 2. A strapped-together bundle of lumber, such as that illustrated at 20, is placed on rollers 28 of the infeed conveyor section. All of the boards in the bundle are of approximately the same length, with the ends of the boards approximately aligned with each other at each end of the bundle. To give an indication of the general size of such apparatus, the bundle illustrated is about 2 feet high, 4 feet wide and 25 feet long.

Motor 32 is operated to cause rollers 28 to move the bundle to the left in FIGS. 1 and 2 until its left, or leading end, extends across cutting path 54. When the operator determines that the leading end of the bundle is properly positioned for trimming he stops motor 32 to stop movement of the bundle.

The rams of clamping mechanism 40 then are retracted to draw the bundle against aligning members 34, to align the bundle and hold it in position. Saw 22 is moved under power along cutting path 54 to trim the leading end from the bundle of lumber and then is returned to the position illustrated. Clamping mechanisms 40 are released and motor 32 is operated to move the bundle of lumber to the left in FIGS. 1 and 2 and onto outfeed conveyor section 16. Motor 72 also is operated to rotate rollers 66 to carry the lumber bundle rapidly onto the outfeed conveyor section. As the bundle of lumber is carried to the left in FIGS. 1 and 2 onto the outfeed conveyor section, its leading end engages arm 104 and the force of the moving bundle overcomes the driving force of motor 100 to carry the indicator dolly and measuring tape therewith. When the operator observes by the measurement indicated on tape 120 that the leading end of the bundle is approximately the desired distance from cutting path 54, motor 72 is stopped.

Final and more precise positioning of the lumber bundle on the outfeed conveyor section is accomplished by operation of ram 76. Explaining further, after the bundle has been rapidly and approximately positioned by operation of rollers 66, and the operation of motor 72 has been interrupted to stop rollers 66, carriage 60 may be moved slowly and precisely by operation of ram 76 to position the bundle of lumber accurately for final trimming. When the measuring tape indicates that the bundle of lumber is properly positioned relative to the cutting path, clamping mechanisms 86 are operated to draw the bundle of lumber against aligning members 84 to hold the bundle of lumber in position. Saw 22 then is moved under power along cutting path 54 to make the final cut in the trailing end of the bundle.

Thereafter the clamping mechanisms release the bundle, ram 112 is extended to swing arm 104 away from the end of the bundle to its inoperative position, and motor 72 is operated to convey the bundle to the left and away from the apparatus.

Since ram 76 provides a slower, and more precise positioning of the bundle of lumber in the apparatus, than the rollers, it has been found that this apparatus can trim bundles of lumber to the nearest one-sixteenth of an inch. Further, the length to which the lumber is to be trimmed can be varied for each individual bundle, rather than being dictated by the specific construction of the apparatus.

While a specific embodiment of the invention has been described herein, it should be apparent to those skilled in the art that variations and modifications are possible without departing from the spirit of the invention.

It is claimed and desired to secure by Letters Patent:

1. Trimming apparatus comprising
trimmer means movable along a trimming path and operable to cut material extending across said path, and
means for positioning material with a portion thereof extending across said trimming path comprising an elongate, substantially horizontal carriage mounted for reciprocal movement in reverse directions along a conveyor path extending at a substantial angle relative to said trimming path, first moving means comprising an interruptible power-driven conveyor mounted on said carriage operable to support such material and convey the same in one direction along said conveyor path over said carriage at a first speed to position such material approximately relative to said trimming path, and second moving means comprising power-operated carriage drive means operatively connected to said carriage for moving the carriage and conveyor mounted thereon in one of said reverse directions at a speed slower than said first speed when operation of said first moving means is interrupted to precisely position such material.

2. The apparatus of claim 1, wherein said conveyor comprises a plurality of rollers journaled on said carriage for rotation about substantially horizontal axes extending transversely of the conveyor path and interruptible drive means operatively connected to said rollers for rotating the same about said axes.

3. The apparatus of claim 1, wherein said carriage drive means comprises an extensible-contractible, fluid-operated ram.

4. Trimming apparatus comprising
an elongated material positioning conveyor for supporting material to be trimmed and operable to convey such material along a path extending longitudinally thereof,
trimmer means intermediate the ends of said conveyor mounted for movement across said path for trimming material supported on said conveyor,
said conveyor comprising an elongated infeed section disposed upstream from said trimmer means operable to position such material in the path with its leading end in a position to be trimmed by the trimmer means, and an elongated outfeed section extending in the direction of said path downstream from said trimmer means for supporting such material and for conveying the same along said path away from said infeed section, said outfeed section comprising an elongated, substantially horizontal carriage extending in the direction of said path, means mounting said carriage for reciprocal movement in reverse directions paralleling said path, a plurality of material support rollers journaled on said carriage for rotation about substantially horizontal axes extending transversely of said path, interruptible power-operated roller drive means operatively connected to said rollers for rotating the same to convey material supported thereon at a first speed along said path to approximately position such material relative to the trimmer means, and power-operated carriage drive means operatively connected to said carriage for moving the same in one of said reverse directions paralleling said path at a speed slower than said first speed for precisely positioning such material relative to said trimmer means.

5. The apparatus of claim 4, wherein said carriage drive means comprises an extensible-contractible, fluid-operated ram.

6. The apparatus of claim 4, which further comprises measuring means for measuring the distance from the trimmer means to an end of material on said outfeed conveyor section, said measuring means comprising an indicator carriage mounted for movement parallel to said path independently of said outfeed conveyor section carriage, an engaging member, means mounting said engaging member on said indicator carriage for movement between an operative position extending into the path of material conveyed along said path, and an inoperative position spaced laterally of said path, and means indicating the distance from said engaging member to said trimmer means.

7. The apparatus of claim 6, which further comprises means yieldably urging said indicator carriage toward said trimmer means.

8. The apparatus of claim 6, wherein said engaging member comprises an elongated arm pivotally mounted adjacent one of its ends on said indicator carriage for swinging between its said operative and inoperative positions, and said arm is swingable in a direction generally downstream along said path on movement from its operative to its inoperative position.

9. The apparatus of claim 8, wherein said measuring means further comprises power-operated means operatively connected to said arm for swinging the same between its operative and inoperative positions.

10. The apparatus of claim 6, wherein said measuring means comprises an elongated guide rail extending parallel to said path, said rail having a ridge extending longitudinally along its upper surface and sloping side margins which diverge on progressing downwardly from said ridge, and said indicator carriage includes means thereon having a lower surface which substantially conforms to and is mounted for movement longitudinally along the ridge and side margins of the guide rail.

11. Apparatus for trimming boards to length comprising
an upright saw movable along a cutting path, and
means for positioning a board with a portion thereof extending across said cutting path, whereby the same may be trimmed to a desired length, comprising an elongated horizontal carriage extending substantially normal to said cutting path, a plurality of board support rollers journaled on the carriage for rotation about horizontal axes extending transversely of the carriage, interruptible drive means operatively connected to said rollers for rotating the same to convey a board supported thereon along a path normal to the cutting path, means mounting the carriage for reciprocal movement toward and away from said cutting path, and power-operated carriage drive means operatively connected to said carriage for moving the same toward and away from said cutting path at a speed slower than the speed with which said rollers are operable to move a board.

12. The apparatus of claim 11, wherein said carriage drive means comprises an extensible-contractible fluid-operated ram.

* * * * *